(12) United States Patent
Li et al.

(10) Patent No.: US 10,914,903 B2
(45) Date of Patent: Feb. 9, 2021

(54) OPTICAL MODULE

(71) Applicant: LINKTEL TECHNOLOGIES CO., LTD, Wuhan (CN)

(72) Inventors: Ning Li, Wuhan (CN); Jian Zhang, Wuhan (CN); Xianwen Yang, Wuhan (CN); Tianshu Wu, Wuhan (CN); Linke Li, Wuhan (CN)

(73) Assignee: LINKTEL TECHNOLOGIES CO., LTD, Hubei (CN)

( * ) Notice: Subject to any disclaimer, the term of this patent is extended or adjusted under 35 U.S.C. 154(b) by 85 days.

(21) Appl. No.: 16/349,158

(22) PCT Filed: Jun. 15, 2018

(86) PCT No.: PCT/CN2018/091456
§ 371 (c)(1),
(2) Date: May 10, 2019

(87) PCT Pub. No.: WO2019/184100
PCT Pub. Date: Oct. 3, 2019

(65) Prior Publication Data
US 2020/0264392 A1 Aug. 20, 2020

(30) Foreign Application Priority Data
Mar. 30, 2018 (CN) ............. 2018 1 0293416

(51) Int. Cl.
*G02B 6/42* (2006.01)
*G02B 6/44* (2006.01)
(52) U.S. Cl.
CPC .......... *G02B 6/4246* (2013.01); *G02B 6/425* (2013.01); *G02B 6/428* (2013.01); *G02B 6/4403* (2013.01)
(58) Field of Classification Search
None
See application file for complete search history.

(56) References Cited

U.S. PATENT DOCUMENTS

2002/0175339 A1* 11/2002 Raj ................. G02B 6/4214
257/99
2003/0038297 A1* 2/2003 Carroll ............. G02B 6/4212
257/99

(Continued)

FOREIGN PATENT DOCUMENTS

CN 102565965 7/2012
CN 203480083 3/2014

(Continued)

OTHER PUBLICATIONS

Office Action dated Mar. 3, 2019 in Chinese Application No. 201810293416.5.

(Continued)

*Primary Examiner* — Michael Stahl
(74) *Attorney, Agent, or Firm* — Stephen J. Weyer, Esq.; Stites & Harbison, PLLC

(57) ABSTRACT

The invention provides an optical module including a circuit board, an optical component and an electrical interface, and the circuit board is provided with a signal rate transmission chip, a laser driver chip, a transimpedance limiting amplifier chip, a vertical cavity surface-emitting laser chip array and a photodetector chip array, and the signal rate transmission chip is electrically connected with the laser driver chip and the transimpedance limiting amplifier chip through the first microstrip line, and the optical component includes an interface end MT ferrule, and a light-emitting ribbon optical cable and a light-receiving ribbon optical cable both connected with the interface end MT ferrule, the light-emitting ribbon optical cable is coupled and aligned with the vertical cavity surface-emitting laser chip array, and the light-receiving ribbon optical cable is coupled and aligned with the photodetector chip array, and the electrical interface includes a gold finger disposed on one side of circuit board. The gold finger and the signal rate transmission chip are (Continued)

electrically connected through the second microstrip line. The present invention achieves a high-density optical package while optimizing the complexity of optical path coupling.

10 Claims, 4 Drawing Sheets

(56) References Cited

U.S. PATENT DOCUMENTS

| | | | |
|---|---|---|---|
| 2008/0062980 A1* | 3/2008 | Sunaga | H04L 49/40 370/389 |
| 2010/0067854 A1* | 3/2010 | Oki | H01R 13/748 385/92 |
| 2011/0249980 A1* | 10/2011 | Takemoto | H04B 10/503 398/201 |
| 2013/0287404 A1* | 10/2013 | McColloch | G02B 6/4246 398/135 |
| 2015/0086211 A1* | 3/2015 | Coffey | H04B 10/0795 398/116 |
| 2015/0092363 A1* | 4/2015 | Blier | H05K 1/189 361/749 |
| 2017/0003464 A1 | 1/2017 | Akieda et al. | |
| 2019/0033542 A1* | 1/2019 | Epitaux | G02B 6/3518 |

FOREIGN PATENT DOCUMENTS

| | | |
|---|---|---|
| CN | 204302542 | 4/2015 |
| CN | 104898216 | 9/2016 |
| CN | 205941991 | 2/2017 |
| CN | 106526762 | 3/2017 |
| CN | 106656343 | 5/2017 |
| CN | 106711763 | 5/2017 |
| CN | 106908911 | 6/2017 |
| CN | 107076951 A | 8/2017 |
| CN | 107608038 | 1/2018 |

OTHER PUBLICATIONS

Office Action dated Aug. 14, 2019 in Chinese Application No. 201810293416.5.
Office Action dated Sep. 12, 2019 in Chinese Application No. 201810293416.5.
Office Action dated Apr. 20, 2020 in Chinese Application No. 201810293416.5.
International Search Report for PCT/CN2018/091456, dated Jan. 8, 2019.

* cited by examiner

OPTICAL MODULE

CROSS-REFERENCE TO RELATED APPLICATIONS

This application claims priority to International Application No. PCT/CN2018/091456, filed on Jun. 15, 2018, which claims the priority benefit of China Patent Application No. 201810293416.5, filed on Mar. 30, 2018. The contents of the above identified applications are incorporated herein by reference in their entirety.

FIELD OF THE INVENTION

The present invention relates to the field of optical modules, and in particular, to an optical module.

DESCRIPTION OF THE RELATED ART

As big data, cloud computing and cloud storage are growing faster, the bandwidth requirements for processing data traffic in the data center are getting higher and higher, which prompts data center to update and upgrade existing equipment systems in time. Upgrading an existing system is a gradual process. It is impossible to replace all existing equipment at once and it requires a large financial cost and causes a waste of resources. Upgrading some of the existing systems will introduce a new problem, how new devices can be interconnected with older devices, enabling maximum performance of the data center. The 100 G MLG2.0 optical module gives a good solution. The module's electrical interface supports 4-channel 25 Gb electrical signals, and the optical port supports 10-channel 10 Gb parallel optical signals, which allows the optical module to be interconnected with 10-channel 10 G SFP+ optical modules or one 40 G QSFP+ optical module plus six 10 G SFP+ optical modules or two 40 G QSFP+ optical modules plus two 10 G SFP+ optical modules. At the same time, the optical module can exchange electrical signals with the 100 G QSFP28 optical module, which finally enables data exchange between the 10 G SFP+ optical module, the 40 G QSFP+ optical module, and the 100 G QSFP28 optical module and greatly improves the interconnection ability between old and new devices in the data center, takes advantage of the data center's maximum performance and has great practical significance.

The difficulty of the QSFP28 MLG optical module package lies in the high-density integrated package. Due to the integration of multiple chips and multi-channel optical components in the QSFP28 package, this poses a high challenge to the packaging technology.

SUMMARY OF THE INVENTION

It is an object of the present invention to provide an optical module that is intended to solve the problem of integrating a multi-chip and a multi-path optical component in a package of a QSFP28 size package.

The present invention is implemented as follows:

The invention provides an optical module including a package and a circuit board located in the package, the circuit board is provided with a signal rate transmission chip, a laser driver chip, a transimpedance limiting amplifier chip, a vertical cavity surface-emitting laser chip array and a photodetector chip array, the laser driver chip is electrically connected with the vertical cavity surface-emitting laser chip array, the transimpedance limiting amplifier chip is electrically connected with the photodetector chip array, and the signal rate transmission chip is electrically connected with the laser driver chip and the transimpedance limiting amplifier chip through a first microstrip line; the optical module further includes an optical component and an electrical interface, the optical component includes an interface end MT ferrule, a light-emitting ribbon optical cable and a light-receiving ribbon optical cable, one end of the light-emitting ribbon optical cable and one end of the light-receiving ribbon optical cable are connected with the interface end MT ferrule, and the other end of the light-emitting ribbon optical cable is aligned with the vertical cavity surface emitting laser chip array by active coupling, the light-receiving ribbon optical cable is aligned with the photodetector chip array by active coupling, the electrical interface including a gold finger disposed on one side of the circuit board, the gold finger and the signal rate transmission chip being electrically connected through a second microstrip line.

Further, the light-emitting ribbon optical cable or the light-receiving ribbon optical cable includes a plurality of sets of independent ribbon optical cables.

Further, the signal rate transmission chip is mounted on the circuit board by SMT.

Further, the laser driver chip, the transimpedance limiting amplifier chip, the vertical cavity surface-emitting laser chip array, and the photodetector chip array are all mounted on the circuit board and cured by using conductive silver paste or adhesive or eutectic solder.

Further, the laser driver chip and the circuit board, the transimpedance limiting amplifier chip and the circuit board, the laser driver chip and the vertical cavity surface-emitting laser chip array, the transimpedance limiting amplifier chip and the photodetector chip array are all electrically connected by means of gold wire bonding or mounting with flip chip.

Further, pads are reserved on the first microstrip line, and the pads are electrically connected with the laser driver chip and the transimpedance limiting amplifier chip by means of gold wire bonding or mounting with flip chip.

Further, the interface end MT ferrule has two rows of through-holes, and one end of the light-emitting ribbon optical cable and one end of the light-receiving ribbon optical cable are respectively inserted into the two rows of the through-holes and fixed with the interface end MT ferrule by glue.

Further, the end of the light-emitting ribbon optical cable or the light-receiving ribbon optical cable away from the interface end MT ferrule has a 45° reflection surface, the optical component further includes V-groove, and the end of the light-emitting ribbon optical cable or the light-receiving ribbon optical cable near the 45° reflection surface is fixed in the V-groove by glue.

Further, the optical component further includes an intermediate MT ferrule and a lens array, the end of the light-emitting ribbon optical cable or the light-receiving ribbon optical cable away from the interface end MT ferrule is fixed with the intermediate MT ferrule, and the lens array is connected and fixed with the intermediate MT ferrule, and the lens array has 45° reflecting surface.

Further, the laser driver chip, the vertical cavity surface emitting laser chip array, the transimpedance limiting amplifier chip and the photodetector chip array are located on the same side of the circuit board, or the laser driver chip and the vertical cavity surface-emitting laser chip array are located on one side of the circuit board, and the transimpedance limiting amplifier chip and the photodetector chip array are located on the other side of the circuit board.

Compared with the prior art, the present invention has the following beneficial effects:

The optical module provided by the invention integrates a large-size signal rate transmission chip, a laser driver chip, a transimpedance limiting amplifier chip, a vertical cavity surface emitting laser chip array and a photodetector chip array in a casing of the QSFP28 package, realizing high-density integrated package requirements for optical modules, and the light-emitting ribbon optical cable and the light-receiving ribbon optical cable are connected with the same interface end MT ferrule, optimizing the complexity of optical path coupling while achieving high-density optical packaging with minimum optical components, and less optical components bring better reliability in optical packaging; and by adopting the optical packaging technology of the invention, the optical path coupling is simple and easy, the coupling efficiency and the coupling yield rate are high, and the utility model is suitable for mass production.

DESCRIPTION OF REFERENCE NUMERALS

1—circuit board, 2—signal rate transmission chip, 3—laser driver chip, 4—vertical cavity surface emitting laser chip array, 5—transimpedance limiting amplifier chip, 6—photodetector chip array, 7—V-groove, 8—light-emitting ribbon optical cable, 9—light-receiving ribbon optical cable, 10—interface end MT ferrule, 11—optical cable's 45° reflective surface, 12—intermediate MT ferrule, 13—lens array, 14—lens' 45° reflective surface.

DESCRIPTION OF EMBODIMENTS

The technical solutions in the embodiments of the present invention are clearly and completely described in the following with reference to the accompanying drawings in the embodiments of the present invention. It is apparent that the described embodiments are only a part of the embodiments of the invention, but not all of the embodiments. All other embodiments obtained by those of ordinary skill in the art based on the embodiments of the present invention without creative efforts are within the scope of the present invention.

First Embodiment

Figure 1:
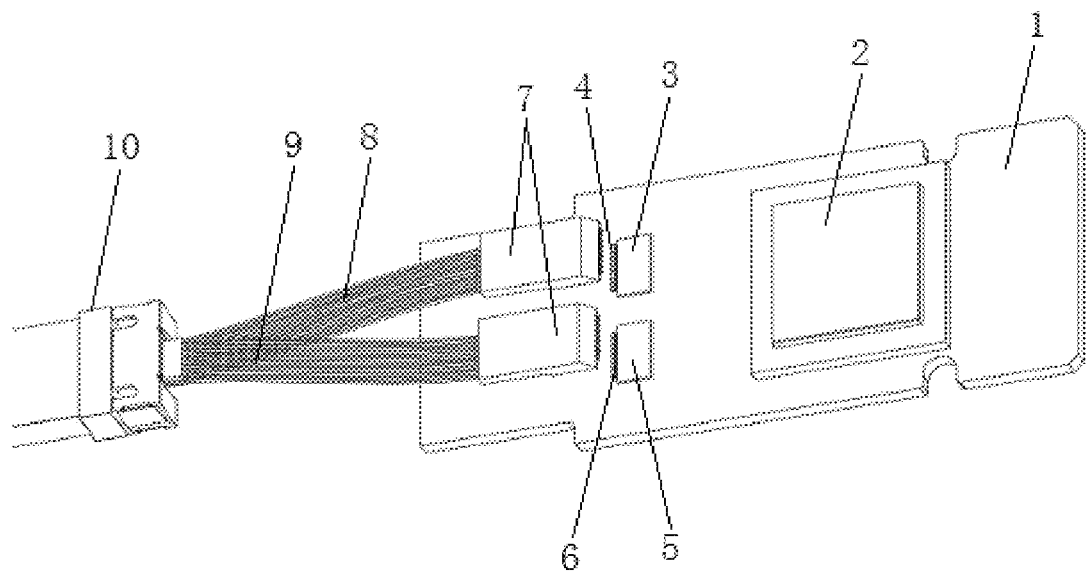
FIG. 1 is a schematic structural diagram of an optical module according to the first embodiment of the present invention.

As shown in FIG. 1, the first embodiment of the present invention provides an optical module. The optical module is a QSFP28 MLG optical module, based on a COB (Chip on Board) process, includes a package (not shown in the figure) and a circuit board 1 located in the package, and further includes an optical component and an electrical interface. The optical port supports 10-channel 10 G light-emitting signals and 10-channel 10 G light-receiving signals. The electrical interface supports 4-channel 25 G electrical signals. The circuit board 1 is provided with a signal rate transmission chip 2, a laser driver chip 3, a transimpedance limiting amplifier chip 5, a vertical cavity surface emitting laser chip array 4, and a photodetector chip array 6.

The signal rate transmission chip 2 is mounted on the circuit board 1 by SMT. The laser driver chip 3, the transimpedance limiting amplifier chip 5, the vertical cavity surface emitting laser chip array 4, and the photodetector chip array 6 are all mounted on the circuit board 1 and cured by conductive silver paste. In other embodiments, the curing method is not limited to be cured by conductive silver paste. It is also possible to use glue adhesive or to use eutectic solder to weld and fix chip. A chip patch's position alignment point (not shown in the figure) is reserved on the circuit board 1 as alignment reference when the chip is mounted. The alignment reference allows the mounting operation to achieve high alignment accuracy without using a high-precision chip mounter. The laser driver chip 3 and the circuit board 1, the transimpedance limiting amplifier chip 5 and the circuit board 1, the laser driver chip 3 and the vertical cavity surface emitting laser chip array 4, and the cross-blocking limiting amplifier chip 5 and the photodetector chip array 6 are all electrically connected by means of gold wire bonding. In other embodiments, the connection method is not limited to the gold wire bonding, and the electrical connection may also be implemented by using a flip chip or the like. The signal rate transmission chip 2 is electrically connected with the laser driver chip 3 and the transimpedance limiting amplifier chip 5 through a first microstrip line (not shown in the figure), respectively. Pads are reserved on the first microstrip line, and the pads are electrically connected with the laser driver chip 3 and the transimpedance limiting amplifier chip 5 by gold wire bonding. In other embodiments, the electrical connection may be implemented by using a flip chip or the like, not limited to the means of gold wire bonding.

Figure 2:
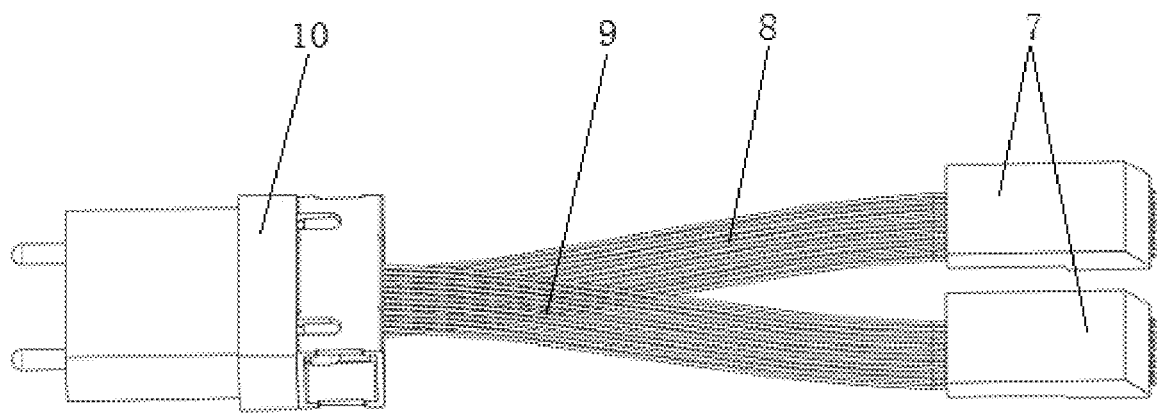
FIG. 2 is a schematic structural view of an optical component according to the first embodiment of the present invention.

As shown in FIG. 2, the optical component includes an interface end MT ferrule 10, a light-emitting ribbon optical cable 8 and a light-receiving ribbon optical cable 9 both connected with the interface end MT ferrule 10, and two V-grooves 7. In the embodiment, the interface end MT ferrule 10 adopts a standard 24-core male MT ferrule, and the light-emitting ribbon optical cable 8 and the light-receiving ribbon optical cable 9 both adopt a 12-core ribbon optical cable with a 45° reflecting surface 11. Refining the connection manner between the interface end MT ferrule 10 and the light-emitting ribbon optical cable 8 and the light-receiving ribbon optical cable 9, the interface end MT ferrule 10 has two rows of through-holes, and the space between any two adjacent through-holes is 250 um. One end of the light-emitting ribbon optical cable 8 and one end of the light-receiving ribbon optical cable 9 are respectively inserted into the two rows of the through-holes to complete the alignment assembly with the interface end MT ferrule 10. The ribbon optical cable are fixed with the interface end MT ferrules 10 by glue. Each end of the light-emitting ribbon optical cable 8 and the light-receiving ribbon optical cable 9 away from the interface end MT ferrule 10 has a 45° reflecting surface 11. Each of the V-groove 7 has 12 rows of V-shaped channels and the space between any two adjacent V-shaped channels is 250 um. Each end of the light-emitting ribbon optical cable 8 and the end of the light-receiving ribbon optical cable 9 near the 45° reflecting surface 11 is respectively placed in the V-shaped channels corresponding to the two V-grooves 7 so as to complete the alignment with the V-groove 7 and fixed by glue. In other embodiments, the interface end MT ferrule 10 is not limited to 24 cores, and 20 to 24 cores are all within the scope of the present patent application. The light-emitting ribbon optical cable 8 and the light-receiving ribbon optical cable 9 are not limited to 12 cores, and 10 to 12 cores are all within the scope of the present patent application. The light-emitting ribbon optical cable 8 and the light-receiving ribbon optical cable 9 are not limited to being one set of ribbon optical cables respectively, and may also respectively use a plurality of sets of independent ribbon optical cables. For example, the light-emitting ribbon optical cable 8 and the light-receiving ribbon optical cable 9 may respectively adopt two sets of 5-core ribbon optical cables. When there are different number of ribbon optical cables, the number of the V-groove 7 will also changes accordingly.

Figure 3:
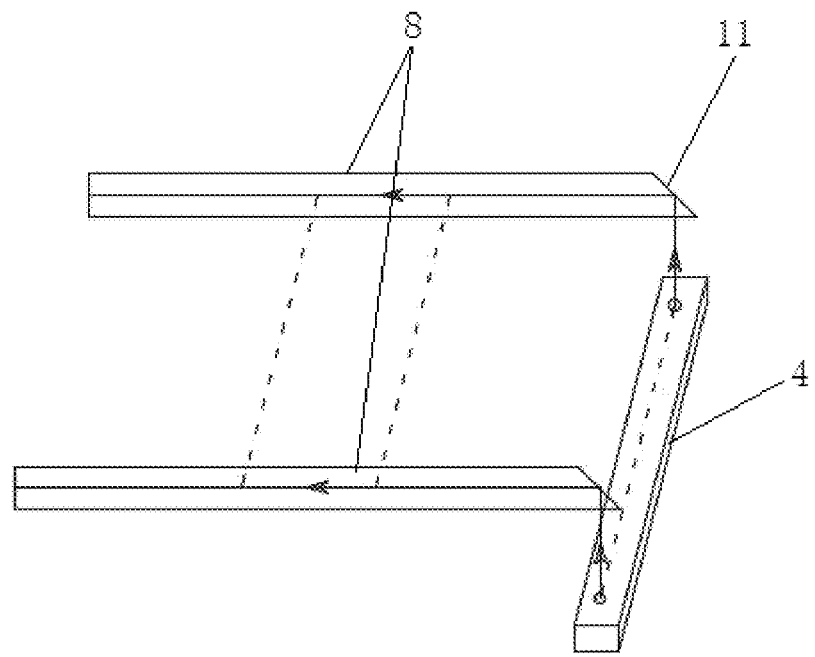
FIG. 3 is a schematic diagram of coupling of an optical component and a vertical cavity surface emitting laser chip array according to the first embodiment of the present invention.
Figure 4:
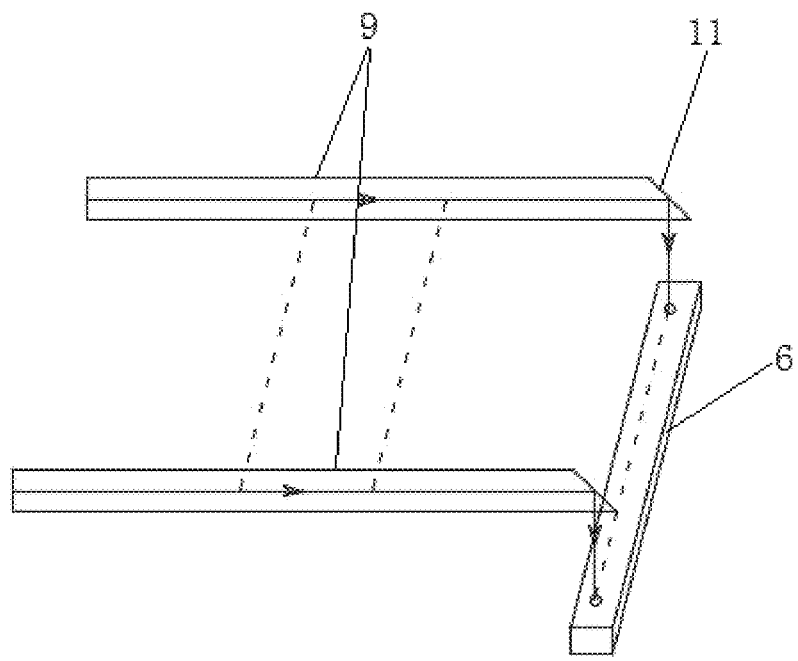
FIG. 4 is a schematic diagram of coupling of an optical component and a photodetector chip array according to the first embodiment of the present invention.

The light-emitting ribbon optical cable 8 is aligned with the vertical cavity surface emitting laser chip array 4 by means of active coupling. The optical path principle of the aligned coupling is shown in FIG. 3. The light-receiving ribbon optical cable 9 and the photodetector chip arrays 6 are aligned by active coupling. The principle of the aligned coupling optical paths is shown in FIG. 4. After the alignment is completed, the light-emitting ribbon optical cable 8 or the light-receiving ribbon optical cable 9 is fixed to the circuit board 1 by glue.

The electrical interface includes gold fingers (not shown in the figure) disposed on one side of the circuit board 1. The gold fingers and the signal rate transmission chip 2 are electrically connected through a second microstrip line (not shown in the figure).

In this embodiment, the laser driver chip 3, the vertical cavity surface emitting laser chip array 4, the transimpedance limiting amplifier chip 5, and the photodetector chip array 6 are all located on the same side of the circuit board 1. In other embodiments, the laser driver chip 3 and the vertical cavity surface emitting laser chip array 4 may be disposed on one side of the circuit board 1, and the transimpedance limiting amplifier chip 5 and the photodetector chip array 6 are located on the other side of the circuit board 1. The position of the V-groove 7 can also be changed according to actual needs. In this embodiment, the signal rate transmission chip 2 is located on the same side of the circuit board 1 with the laser driver chip 3, the vertical cavity surface emitting laser chip array 4, the transimpedance limiting amplifier chip 5 and the photodetector chip array 6. In other embodiments, the signal rate transmission chip 2 can also be disposed on the opposite side of the circuit board 1.

The working principle of the optical module provided by the present invention is as follows:

The external 4 channels of 25 G parallel electrical signals are loaded onto the signal rate transmission chip 2 by the golden finger, and the signal rate transmission chip 2 converts the 4 channels of 25 G parallel electrical signals into 10-channel 10 G parallel electrical signals. The 10-channel 10 G electrical signals outputted from the signal rate transmission chip 2 are loaded on the laser driver chip 3, and the laser driver chip 3 drives the vertical cavity surface emitting laser chip array 4 to convert the 10-channel parallel electrical signals into 10-channel 10 G parallel optical signals. The 10-channel 10 G parallel optical signals are aligned with the light-emitting ribbon optical cable 8 with the 45° reflecting surface 11 by means of active coupling. The optical signals coupled into the light-emitting ribbon optical cable 8 finally pass through the ports of the interface end MT ferrule 10 to complete the output of 10-channel 10 G parallel optical signals.

The external 10-channel 10 G parallel optical signals enter the array of the light-receiving ribbon optical cable 9 with 45° reflecting surfaces through ports of the interface end MT ferrule 10. The 10-channel 10 G parallel optical signals from the light-receiving ribbon optical cable 9 are aligned with the photodetector chip array 6 by means of active coupling. After receiving the optical signals, the photodetector chip array 6 converts them into 10-channel 10 G parallel electrical signals and amplify them through the transimpedance limiting amplifier chip 5 and then output. The electrical signals output from the transimpedance limiting amplifier chip 5 are loaded on the signal rate transmission chip 2, and the signal rate transmission chip 2 converts the 10-channel 10 G parallel electrical signals into 4-channel 25 G parallel electrical signals and passes the 4-channel 25 G parallel electrical signals to the external system through the golden fingers on one side of the circuit board 1.

Second Embodiment

Figure 5:
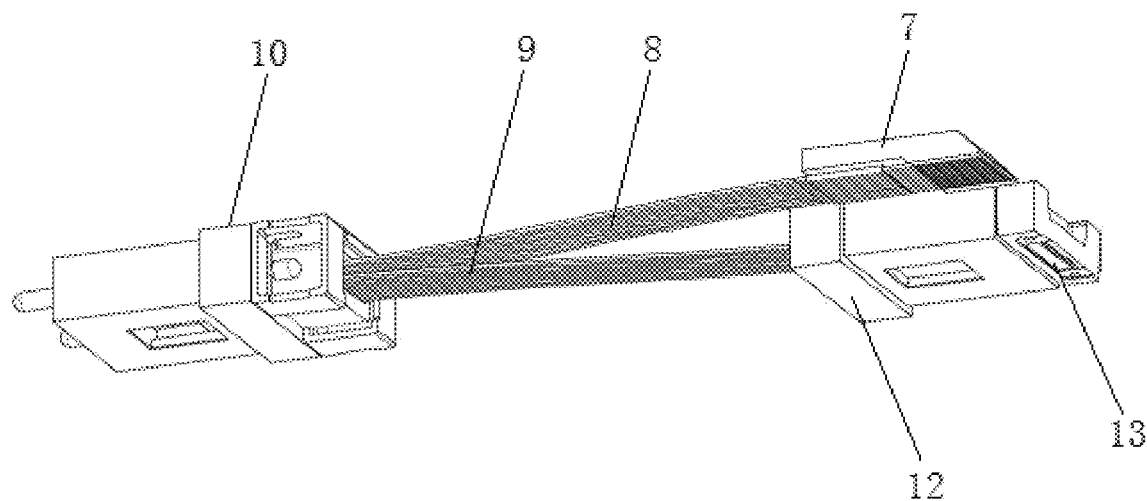
FIG. 5 is a schematic structural diagram of an optical component according to the second embodiment of the present invention.

As shown in FIG. 5, the second embodiment of the present invention provides an optical module, which is different from the optical module provided in the first embodiment of the present invention only in the structure of the optical component, and the other components are identical in structure, and details will not be described herein again.

Figure 6:
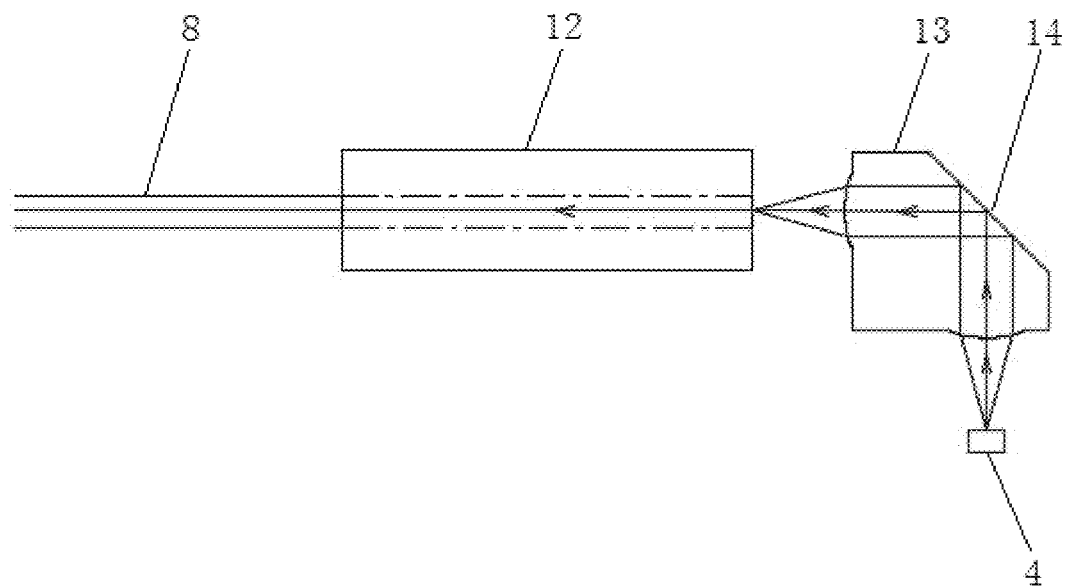
FIG. 6 is a schematic diagram of coupling of an optical component and a vertical cavity surface emitting laser chip array according to the second embodiment of the present invention.
Figure 7:
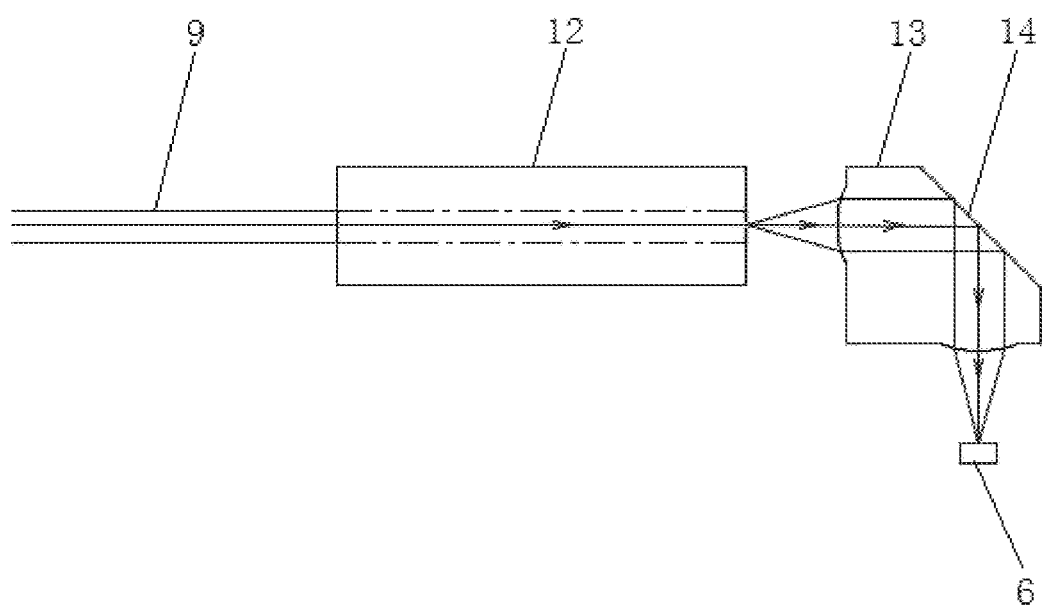
FIG. 7 is a schematic diagram of coupling of an optical component and a photodetector chip array according to the second embodiment of the present invention.

In this embodiment, the optical component includes an interface end MT ferrule 10, a light-emitting ribbon optical cable 8 and a light-receiving ribbon optical cable 9 both connected with the interface end MT ferrule 10, a V-groove 7, and a set of combination of intermediate MT ferrule 12 and the lens array 13. The structure of the interface end MT ferrule 10, and its connection manner with the light-emitting ribbon optical cable 8 and the light-receiving ribbon optical cable 9 in the embodiment are the same as those in the first embodiments and will not be described herein again. The light-emitting ribbon optical cable 8 and the light-receiving ribbon optical cable 9 are different from those in the first embodiment in that one of the ribbon optical cables does not have a 45° reflection surface and the ribbon optical cable without the 45° reflection surface is connected and fixed with the intermediate MT ferrule 12 and the lens array 13, and the other ribbon optical cable with a 45° reflecting surface is connected and fixed with the V-groove 7 in the same manner as in the first embodiment. As shown in FIG. 5, the light-emitting ribbon optical cable 8 has a 45° reflecting surface, and the light-receiving ribbon optical cable 9 does not have a 45° reflecting surface, and the two can be reversed. The end of the ribbon optical cable without the 45° reflecting surface away from the interface end MT ferrule 10 is fixed with the intermediate MT ferrule 12, and the lens array 13 is connected and fixed with the end of the intermediate MT ferrule 12, the lens array 13 has a 45° reflecting surface 14, and the coupling optical paths of the lens array 13 and the optical chip are shown in FIGS. 6 and 7. The intermediate MT ferrule 12 has two alignment holes, and the lens array 13 has two positioning posts. After the active coupling between the lens array 13 and the relevant optical chip is completed, the two positioning posts on the lens array 13 are respectively inserted into the alignment holes of the intermediate MT ferrule 12 to complete the alignment assembly of the lens array 13 and intermediate MT ferrule 12. In this embodiment, the lens array 13 is located at the end of the intermediate MT ferrule 12 away from the interface end MT ferrule 10.

In the above second embodiment, it is equivalent to replacing one of the V-groove 7 of the first embodiment with the combination of the intermediate MT ferrule 12 and the lens array 13. In another embodiment, the two V-grooves 7 of the first embodiment can also be replaced with the combination of the intermediate MT ferrule 12 and the lens array 13 in the second embodiment, and details thereof will not be described herein again.

The above is only the preferred embodiment of the present invention, and is not intended to limit the present invention. Any modifications, equivalent substitutions, improvements, etc, which are included in the spirit and scope of the present invention, should be included in the scope of protection of present invention.

What is claimed is:

1. An optical module, comprising a package and a circuit board located in the package; wherein,
   the circuit board is provided with a signal rate transmission chip, a laser driver chip, a transimpedance limiting amplifier chip, a vertical cavity surface-emitting laser chip array and a photodetector chip array,
   the laser driver chip is electrically connected with the vertical cavity surface-emitting laser chip array, the transimpedance limiting amplifier chip is electrically connected with the photodetector chip array, and the signal rate transmission chip is electrically connected with the laser driver chip and the transimpedance limiting amplifier chip through a first microstrip line;
   the optical module further includes an optical component and an electrical interface, the optical component includes an interface end MT ferrule, a light-emitting ribbon optical cable and a light-receiving ribbon optical cable, one end of the light-emitting ribbon optical cable and one end of the light-receiving ribbon optical cable are connected with the interface end MT ferrule;
   the other end of the light-emitting ribbon optical cable is aligned with the vertical cavity surface emitting laser chip array by active coupling, the light-receiving ribbon optical cable is aligned with the photodetector chip array by active coupling, the electrical interface includes gold fingers disposed on one side of the circuit board, the gold fingers and the signal rate transmission chip are electrically connected through a second microstrip line.

2. The optical module as claimed in claim 1, wherein the light-emitting ribbon optical cable or the light-receiving ribbon optical cable includes a plurality of sets of independent ribbon optical cables.

3. The optical module as claimed in claim 1, wherein the signal rate transmission chip is mounted on the circuit board by SMT.

4. The optical module as claimed in claim 1, wherein the laser driver chip, the transimpedance limiting amplifier chip, the vertical cavity surface-emitting laser chip array, and the photodetector chip array are all mounted on the circuit board and cured by using conductive silver paste or adhesive or eutectic solder.

5. The optical module as claimed in claim 1, wherein the laser driver chip and the circuit board, the transimpedance limiting amplifier chip and the circuit board, the laser driver chip and the vertical cavity surface-emitting laser chip array, the transimpedance limiting amplifier chip and the photodetector chip array are all electrically connected by means of gold wire bonding or mounting with flip chip.

6. The optical module as claimed in claim 1, wherein pads are reserved on the first microstrip line, and the pads are electrically connected with the laser driver chip and the transimpedance limiting amplifier chip by means of gold wire bonding or mounting with flip chip.

7. The optical module as claimed in claim 1, wherein the interface end MT ferrule has two rows of through-holes, and one end of the light-emitting ribbon optical cable and one end of the light-receiving ribbon optical cable are respectively inserted into the two rows of the through-holes and fixed with the interface end MT ferrule by glue.

8. The optical module as claimed in claim 1, wherein the end of the light-emitting ribbon optical cable or the light-receiving ribbon optical cable away from the interface end MT ferrule has a 45° reflection surface, the optical component further includes a V-groove, and the end of the light-emitting ribbon optical cable or the light-receiving ribbon optical cable near the 45° reflection surface is fixed in the V-groove by glue.

9. The optical module as claimed in claim 1, wherein the optical component further includes an intermediate MT ferrule and a lens array, the end of the light-emitting ribbon optical cable or the light-receiving ribbon optical cable away from the interface end MT ferrule is fixed with the intermediate MT ferrule, and the lens array is connected and fixed with the intermediate MT ferrule, and the lens array has a 45° reflecting surface.

10. The optical module as claimed in claim 1, wherein the laser driver chip, the vertical cavity surface emitting laser chip array, the transimpedance limiting amplifier chip and the photodetector chip array are located on the same side of the circuit board; or,
   the laser driver chip and the vertical cavity surface-emitting laser chip array are located on one side of the circuit board, and the transimpedance limiting amplifier chip and the photodetector chip array are located on the other side of the circuit board.

* * * * *